(12) United States Patent
Schütt et al.

(10) Patent No.: US 6,572,175 B2
(45) Date of Patent: Jun. 3, 2003

(54) LOWERABLE ROOF OF A CONVERTIBLE

(75) Inventors: Thomas Schütt, Fürstenfeldbruck (DE); Stefan Miklosi, München (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/941,159

(22) Filed: Aug. 29, 2001

(65) Prior Publication Data

US 2002/0030381 A1 Mar. 14, 2002

(30) Foreign Application Priority Data

Aug. 29, 2000 (DE) .......................................... 100 42 460

(51) Int. Cl.⁷ .................................................. B60J 7/08
(52) U.S. Cl. .................. 296/108; 296/115; 296/107.13; 296/107.17
(58) Field of Search ................................ 296/108, 115, 296/117, 107.08, 107.09, 107.13, 107.15, 107.17, 107.18, 107.19, 107.2

(56) References Cited

U.S. PATENT DOCUMENTS

| | | | | | |
|---|---|---|---|---|---|
| 2,997,337 A | * | 8/1961 | Day et al. | ............... | 296/107.08 |
| 3,370,308 A | * | 2/1968 | Krenzler | .................... | 114/361 |
| 3,655,238 A | * | 4/1972 | Stewart | ................. | 296/107.15 |
| 5,769,483 A | * | 6/1998 | Danzl et al. | ........... | 296/107.08 |
| 6,053,560 A | * | 4/2000 | Rothe | ..................... | 296/107.16 |
| 6,305,735 B1 | * | 10/2001 | Neubrand | ............... | 296/107.09 |
| 6,336,673 B1 | * | 1/2002 | Rothe et al. | ........... | 296/107.17 |
| 6,390,531 B1 | * | 5/2002 | Schutt | .................... | 296/107.13 |
| 6,422,637 B1 | * | 7/2002 | Mac Farland | .......... | 296/107.15 |
| 2001/0006297 A1 | * | 7/2001 | Dintner et al. | ......... | 296/107.17 |
| 2001/0033090 A1 | * | 10/2001 | MacFarland | ........... | 296/107.09 |
| 2001/0040385 A1 | * | 11/2001 | Obendiek | ................... | 296/108 |

FOREIGN PATENT DOCUMENTS

| | | | |
|---|---|---|---|
| DE | 39 03 358 | 8/1990 | |
| DE | 44 35 222 | 11/1995 | |
| DE | 196 26 280 | 1/1998 | |
| DE | 196 42 152 | 4/1998 | |
| EP | 1092579 A1 | * 4/2001 | .............. B60J/7/12 |

* cited by examiner

Primary Examiner—D. Glenn Dayoan
Assistant Examiner—Patricia Engle
(74) Attorney, Agent, or Firm—Nixon Peabody LLP; David S. Safran

(57) ABSTRACT

A lowerable roof (1) of a hard-top convertible (2) with a front roof element (3), a middle roof element (4) and a rear roof element (5) which can all be moved out of a closed position which covers the motor vehicle interior (6) by a bearing mechanism into an open position in which they are deposited on top of one another in a rear-side convertible top storage compartment (9). The front roof element (3) is movably supported on the middle roof element (4), and the front roof element (3) can be lowered or raised by a carrier mechanism (17) which supports the front roof element (3) on the middle roof element (3) when the roof (1) is being moved to over or under the middle part (4) by a lengthwise guide (29).

16 Claims, 14 Drawing Sheets

LOWERABLE ROOF OF A CONVERTIBLE

BACKGROUND OF THE INVENTION

1. Field of the Invention

The invention relates to the lowerable roof of a convertible with a front element, a middle element and a rear element which can all be moved out of a closed position which covers the motor vehicle interior by a bearing means into an open position in which they are deposited on top of one another in a rear-side convertible top compartment, the front element being movably supported on the middle element.

2. Description of Related Art

Published German Patent Application DE 196 42 152 A1 discloses a generic lowerable roof of a motor vehicle in which the front element of the roof is movably supported by means of a four-bar mechanism on the middle element and the latter in turn is supported via the four-bar mechanism on the rear element. The rear element is movably supported via two rods on the body. When the roof is being opened first the rear element is swung and in doing so entrains the front element and the middle element in a position which is unchanged to one another. Via the rod which supports the rear element motion is initiated to the two four-bar mechanisms of the front element and the middle element, i.e., the mechanisms which are coupled to one another, so that the front element is swung to under the middle element and the two elements together are swung to under the rear element. The roof elements in this identically cambered arrangement stacked on top of one another are lowered into the convertible top compartment.

SUMMARY OF THE INVENTION

The object of the invention is to devise a lowerable roof of the initially mentioned that is provided with an improved support and movement mechanism for the front element.

This object is achieved in accordance with the present invention in that the front element can be lowered or raised by a carrier means which supports the front element on the middle element when the roof is being deposited with respect to the middle part and can be moved to over or under the middle part by a lengthwise guide means. While in the roof known from the prior art the front element is swung by means of the four-bar mechanism over a comparatively large pivot radius to under the middle element, in the roof according to the invention, a small raising or lowering motion is sufficient, with which the front element is raised or lowered relative to the middle element depending on the alternative only to the extent that the front element can be pushed over or under the middle element.

In one preferred embodiment, the carrier means contains a four-bar mechanism which supports the front element on the middle element, which mechanism has a raising and lowering motion controlled by the deposition motion of the roof. Control can take place by a mechanical coupling which, for example, contains a coupling rod which couples the four-bar mechanism to the bearing means which movably supports the middle part on the body. Thus, no additional drive is necessary for swinging of the front element.

Feasibly, the carrier means or the four-bar mechanism contains a carrier element which is movably guided on the lengthwise guide of the front element.

Preferably, the carrier means contains a four-bar mechanism which supports the front element on the middle element and which is movably guided on the lengthwise guide of the middle element and during lengthwise displacement of the front element relative to the middle element executes the raising and lowering motion of the front element by a control means. Raising and lowering the front element are thus initiated by the front element which has been pushed in the lengthwise direction. The front element can be moved especially by a drive means which contains, for example, an electric motor with drive cable connections to the front element.

The swinging motion of the four-bar mechanism is controlled, for example, by a lever which is connected to the four-bar mechanism and has a control element which is guided in a control cam. The control cam can be formed as a unique cam path on the middle element or the lengthwise guide forms at least one section of the control cam.

Preferably the bearing means of the middle element of the roof is formed by two rods which form the main four-bar mechanism, but there can also be other bearing and movement means.

One especially simple configuration which saves space when deposited calls for the rear element to be deposited relative to the front element and the middle element in an oppositely cambered position in the convertible top compartment. To do this, especially the rear element is attached to one of the rods of the main four-bar mechanism which supports the middle element.

Embodiments of the roof are explained in detail below with respect to the accompanying drawings.

DETAILED DESCRIPTION OF THE INVENTION

Figure 1:
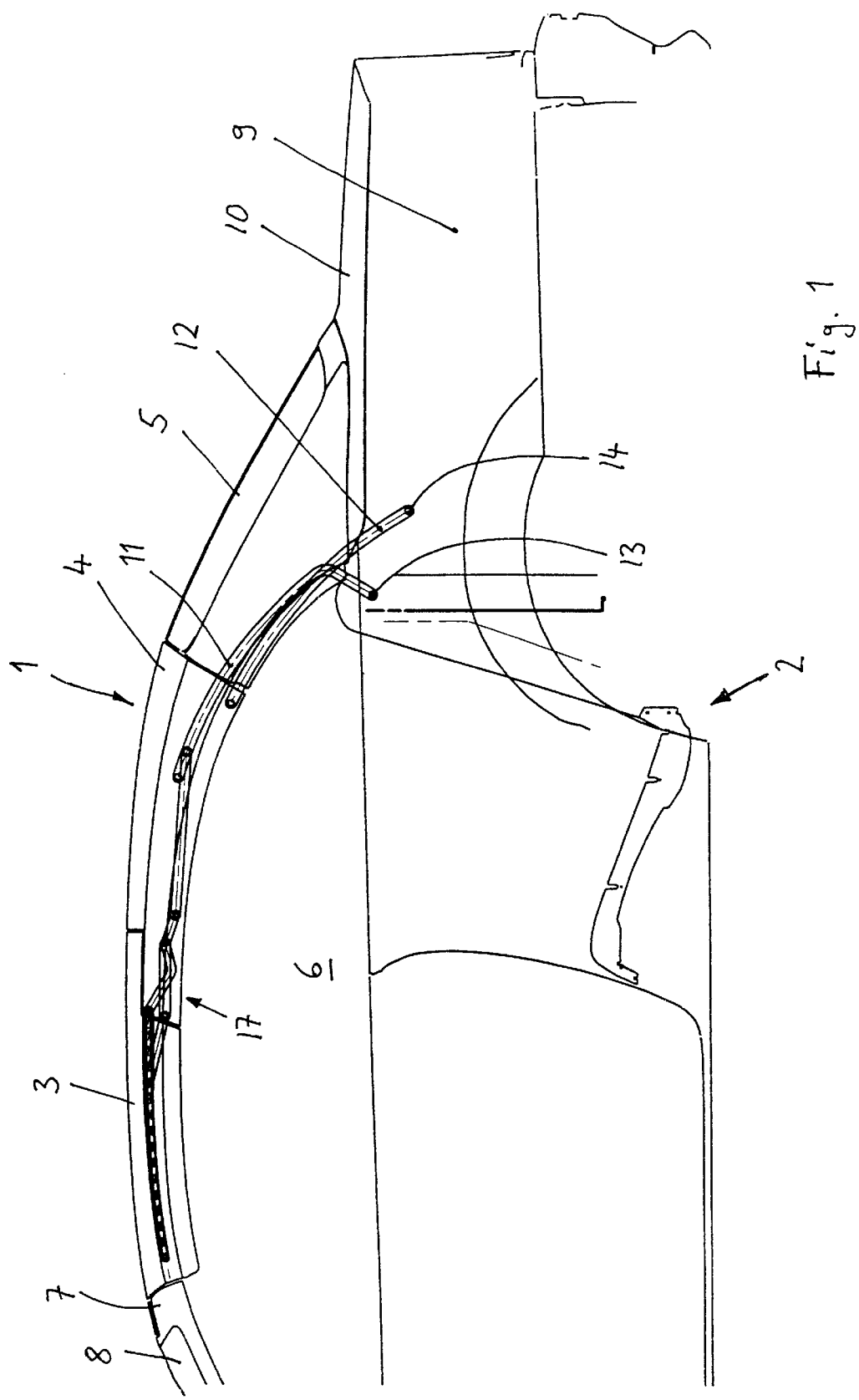
FIG. 1 shows in a side view in a schematic a convertible with one embodiment of a lowerable roof in the closed position.

The roof 1 of a convertible 2 is formed as a lowerable hardtop convertible, which has a front element 3, a middle element 4 and a rear element 5 as the movable, hard/rigid roof elements. In the closed position of the roof 1 (see FIG. 1), in which the three roof elements 3, 4, and 5 cover the motor vehicle interior 6, the front element 3 borders the cowl 7 above the front window 8. When the roof 1 is opened and lowered, the three roof elements 3, 4, 5 are deposited by a bearing means in a rear-side roof stowage space or convertible top storage compartment 9 which is covered by a movable flap 10 of the convertible top compartment 9. The components of the bearing means which moves and supports the three roof elements 3, 4, and 5 are each located symmetrically to the lengthwise axis of the motor vehicle on the edge side on the roof elements 3, 4, 5 so that the following components which are described for one roof or motor vehicle side, correspond to the components located on the opposite side.

Figure 3:
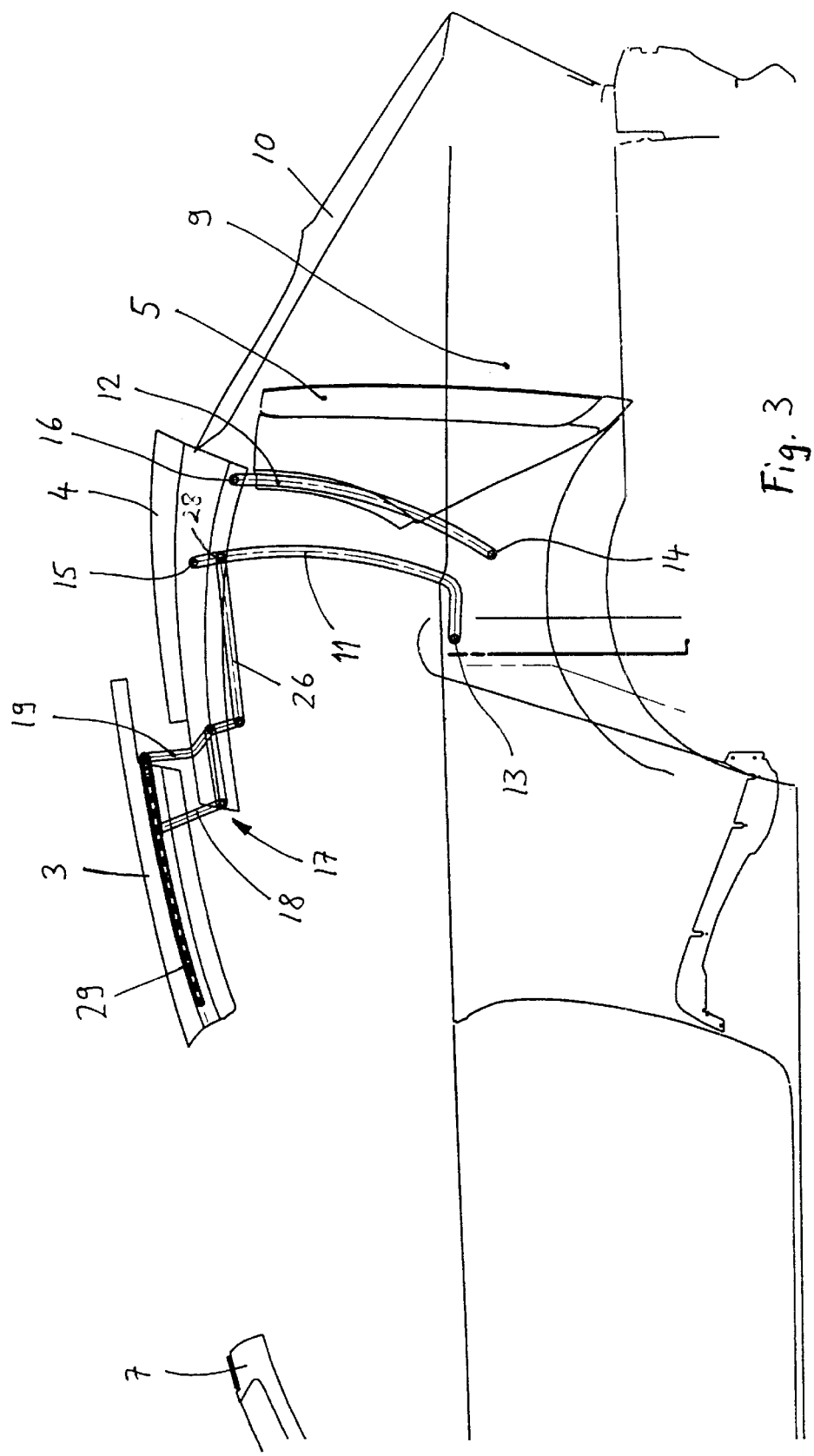
FIG. 3 shows in a side view the roof which has been moved into an intermediate position.
Figure 4:
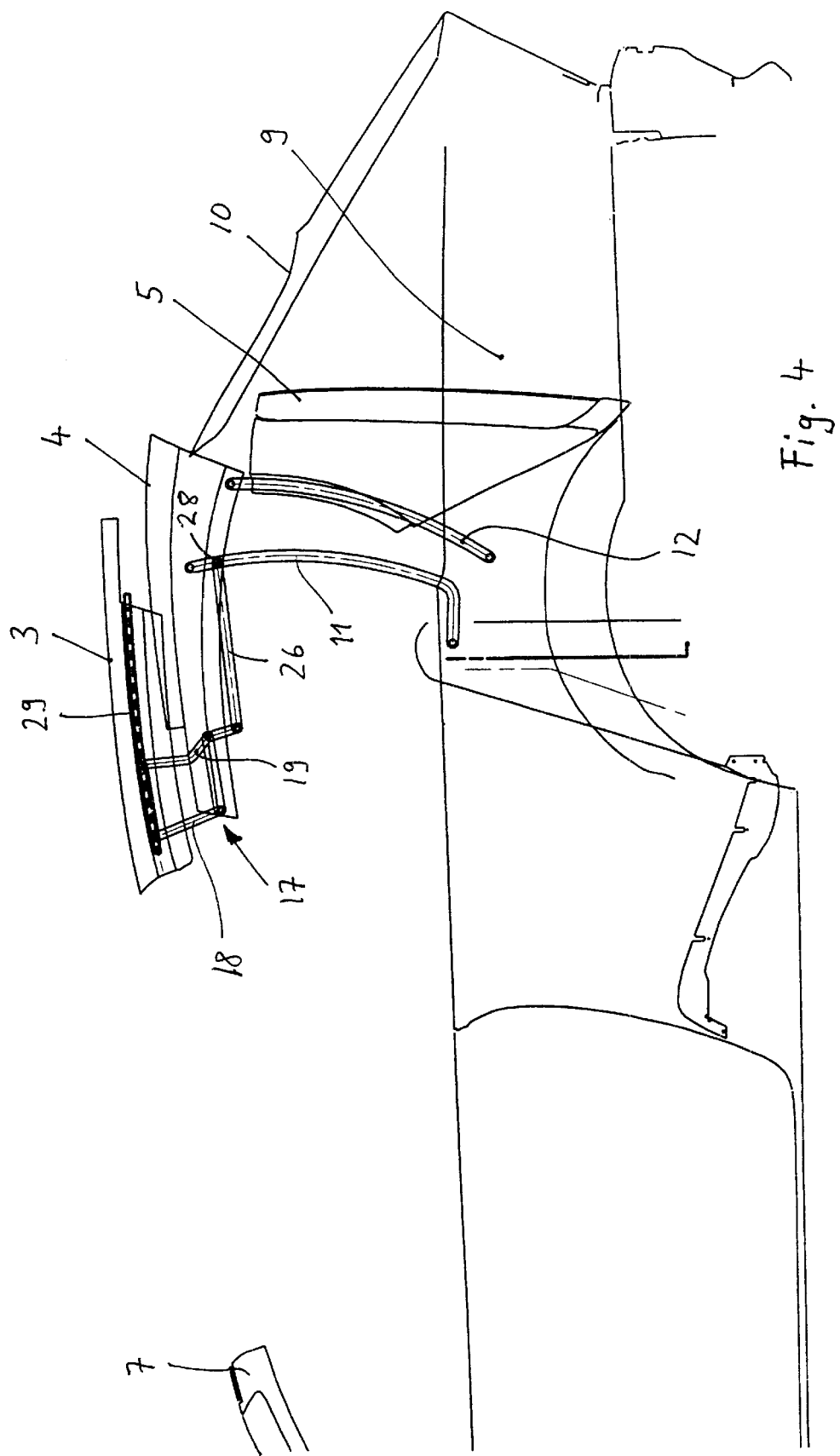
FIG. 4 shows a side view the roof which is located in the intermediate position with a displaced front element.
Figure 7:
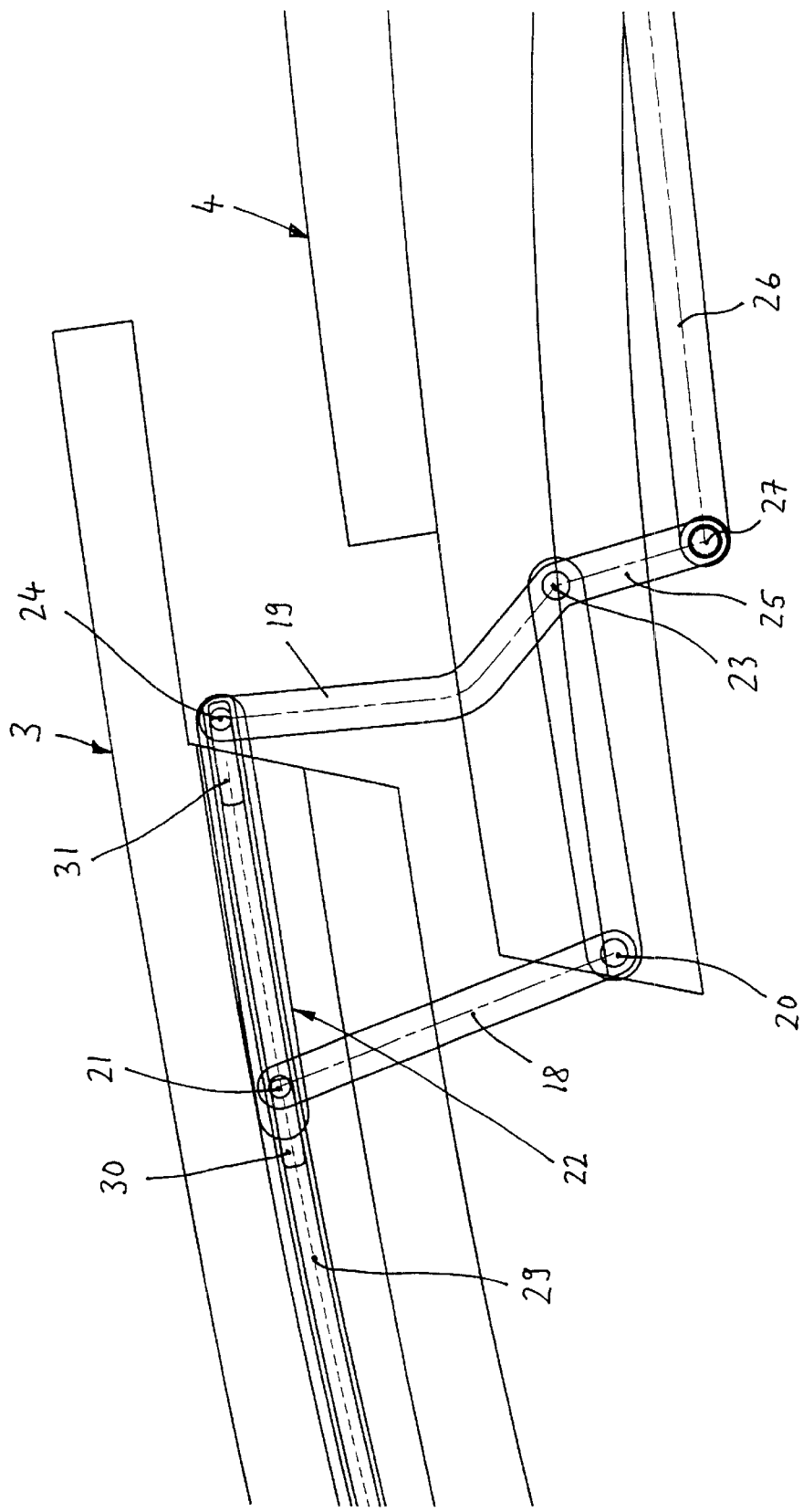
FIG. 7 is an enlarged side view of an extract of the roof in the position shown in FIG. 3.
Figure 8:
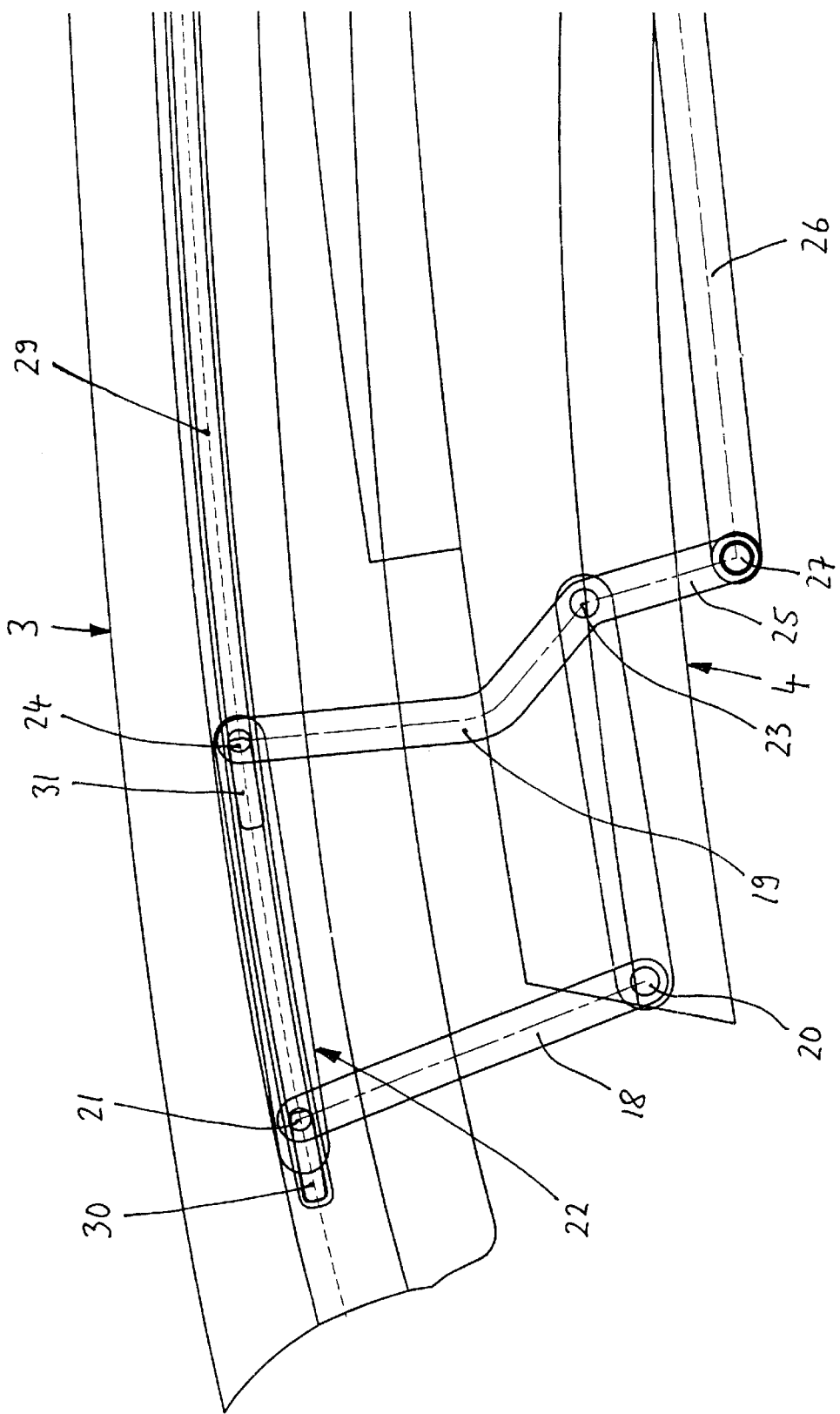
FIG. 8 is an enlarged side view of an extract of the roof in the position shown in FIG. 4.

The middle element 4 of the roof 1 is movably supported on the body by means of a main four-bar mechanism of the bearing means which has a front rod 11 and a rear rod 12, the rods 11, 12, on the one hand, being supported to pivot on the body-mounted bearing points 13, 14, and on the other hand, on joints 15, 16 on the middle roof element 4 (FIG. 3). The rear element 5 is attached to the rear rod 12 and can be swung with it around the body-mounted bearing point 14. On the front section of the middle roof element 4, there is a carrier means 17 for the front element 3 which has front and a rear pivot lever 18, 19 of a four-bar mechanism. The front pivot lever 18 is supported to be able to pivot, on the one hand, in a joint 20 on the middle part 4, and on the other hand, in a joint 21 on the carrier element 22 for the front element 3 (see especially FIG. 7). The rear pivot lever 19 is supported to be able to pivot in the joint 23 on the middle part 4 and in the joint 24 on the carrier element 22. An extension of the pivot lever 19 which extends beyond the rear joint 23 forms a control lever 25 which is pivotably connected via a joint 27 with a connecting rod 26 which is, in turn, hinged to the front rod 11 in a joint 28 (FIGS. 3 & 4).

The front element 3 contains a guide rail 29 which runs along the front element 3 and on which the carrier element 22 is movably supported, for example, via two carriages 30, 31. The front element 3 can be moved by a drive means, for example, an electric motor (not shown), relative to a carrier element 22 and can be fixed, especially in a front and a rear end position (see, for example, FIGS. 3 & 4).

Figure 2:
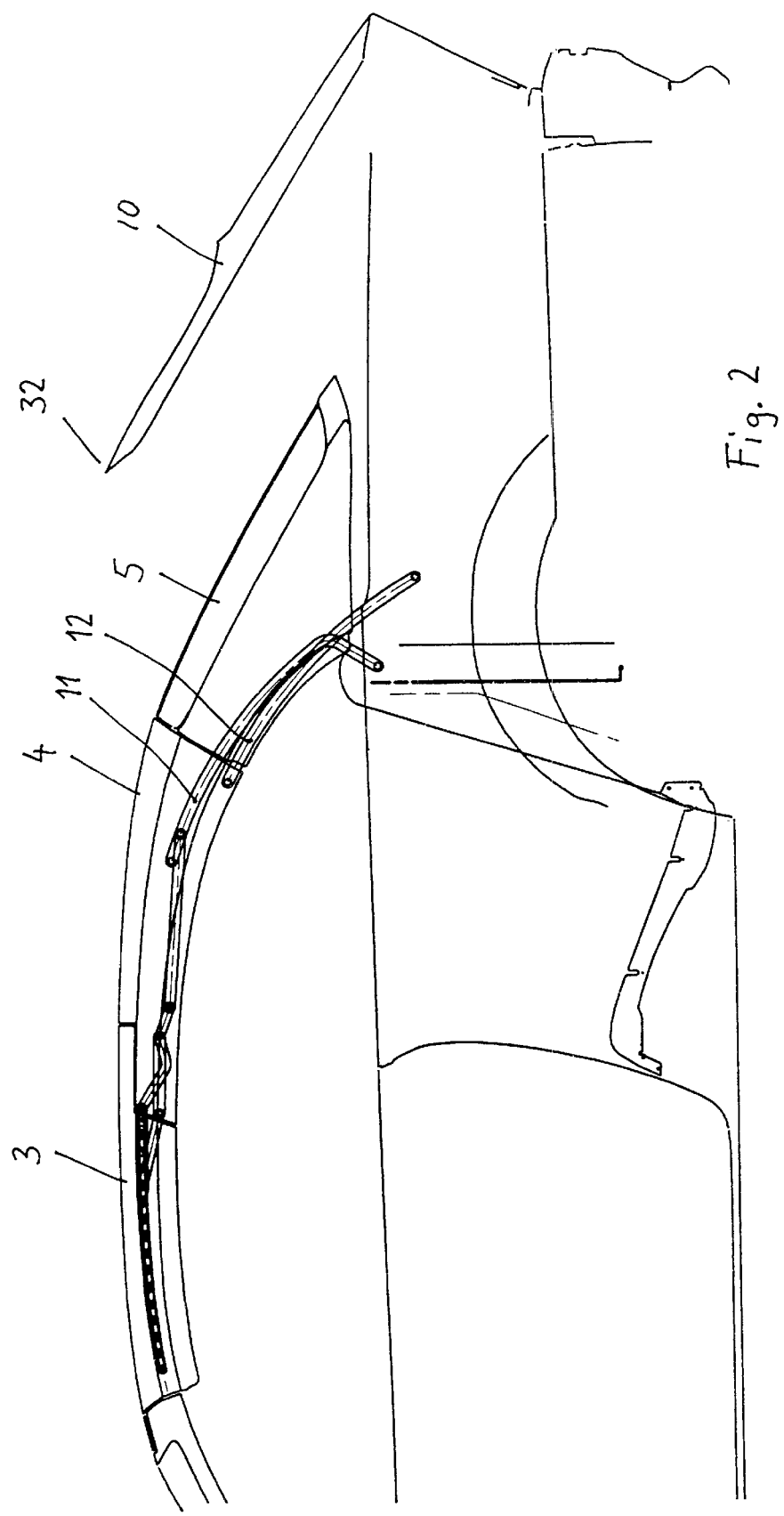
FIG. 2 shows in a side view the roof in the closed position with the flap of the convertible top storage compartment opened.
Figure 5:
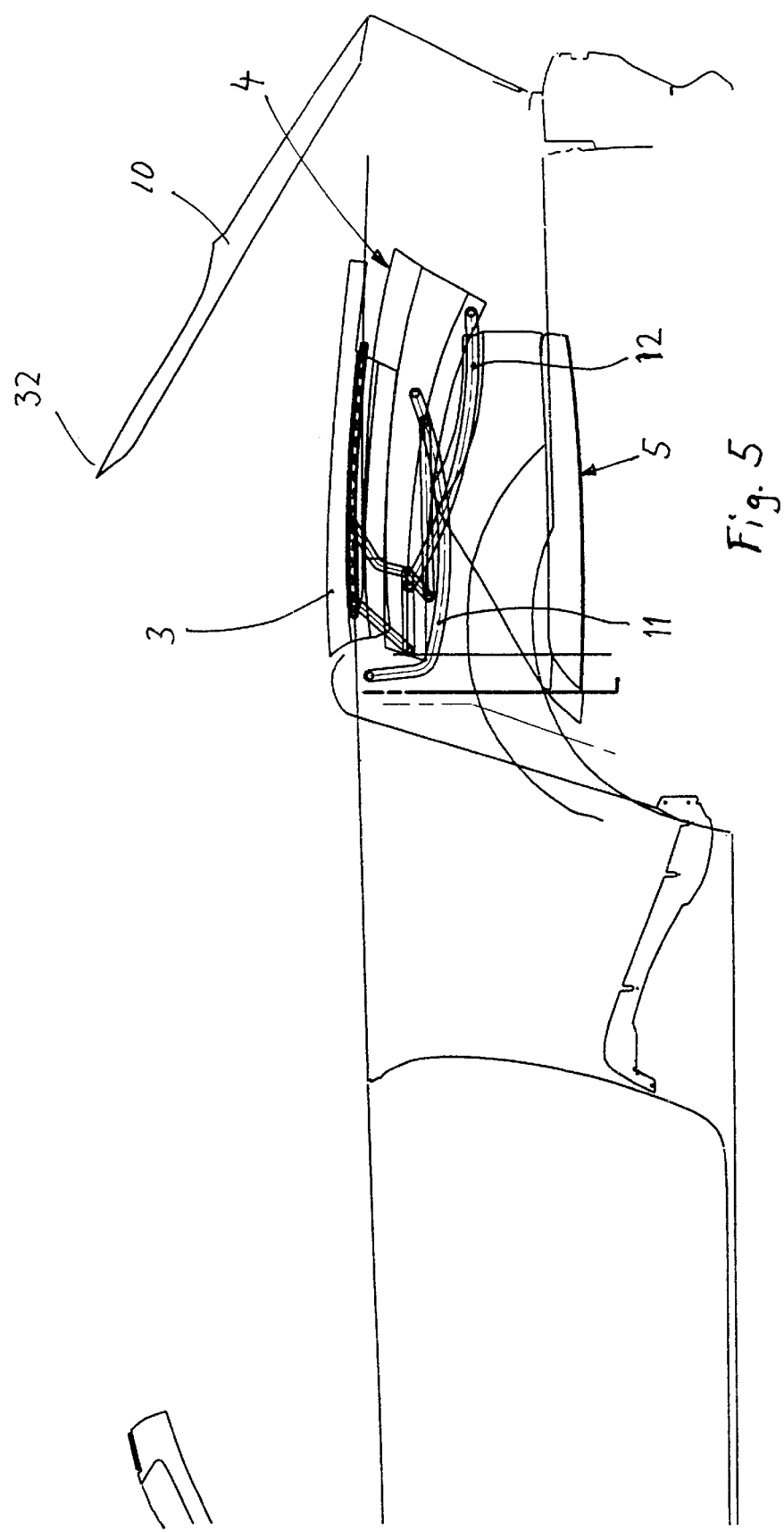
FIG. 5 is a side view the roof which has been lowered into the convertible top compartment.
Figure 6:
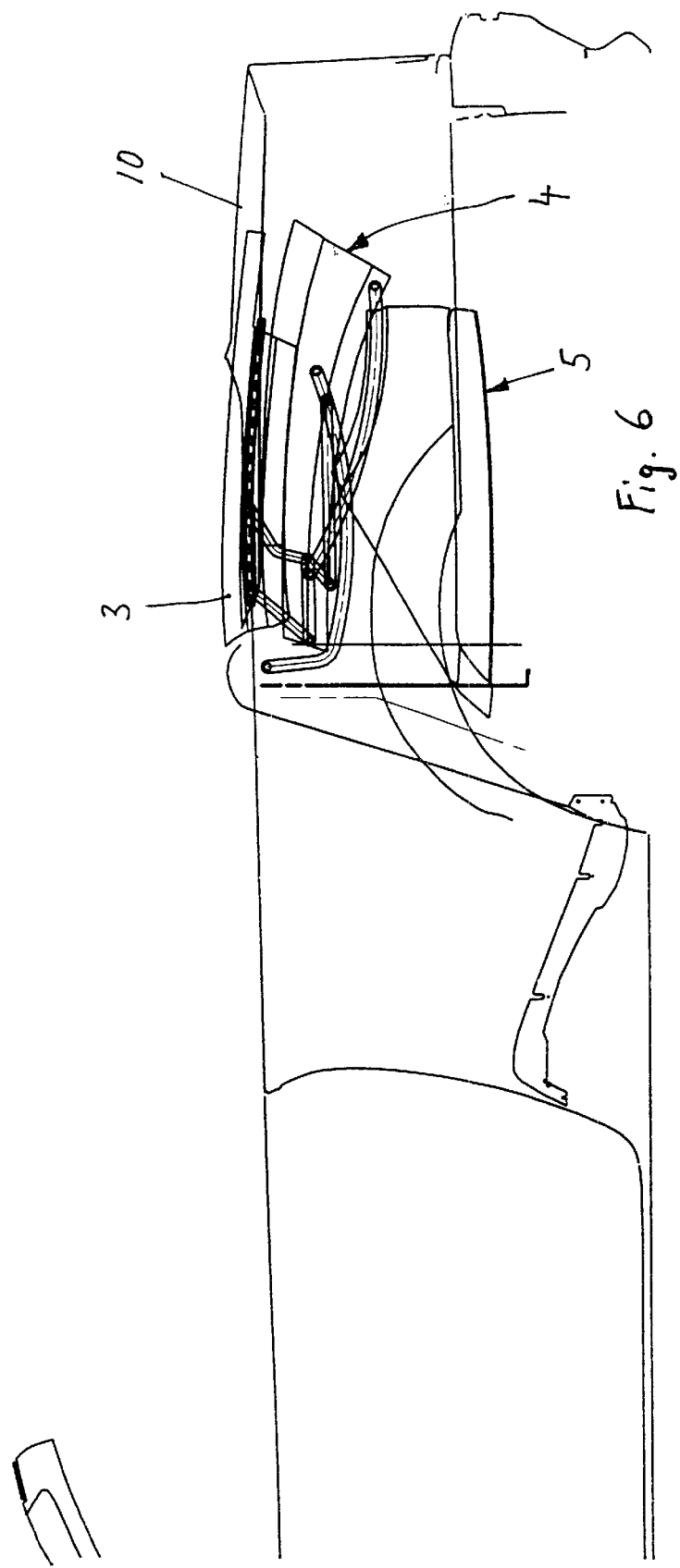
FIG. 6 is a side view the roof which is accommodated stacked in the convertible top storage compartment with the flap of the convertible top storage compartment closed.

To open the roof 1, first the flap 10 of the convertible top compartment is swung up at its front edge 32, for example, around a rear transverse pivot axis (FIG. 2). Then, the main four-bar mechanism 11, 12 which supports the middle element 4 is swung by a drive (not shown) into an intermediate position (FIG. 3) in which, via the connecting rod 26 and the front four-bar mechanism 18, 19 of the carrier means 17, the carrier element 22, and thus, the front element 3, are raised up relative to the middle element 4. In this raised position, the front element 3 is pushed by its displacement drive relative to the carrier element 22 and the middle element 4 to the rear into its back end position via the middle element 4 (FIG. 4). At this point, the main four-bar mechanism 11, 12 continues to be swung to the rear so that both the rear element 5, which is moved with the rear rod 12, and also the front element 3 and the middle element 4 which are located horizontally on top of one another, are deposited in the convertible top compartment 9. Here, the rear element 5 with its bottom or inside turned up is in the oppositely cambered position under the front element 3 and the middle element 4 (FIG. 5). Finally, the flap 10 of the convertible top compartment is closed again (FIG. 6).

The roof 1 is closed in the reverse sequence of motions.

Figure 9:
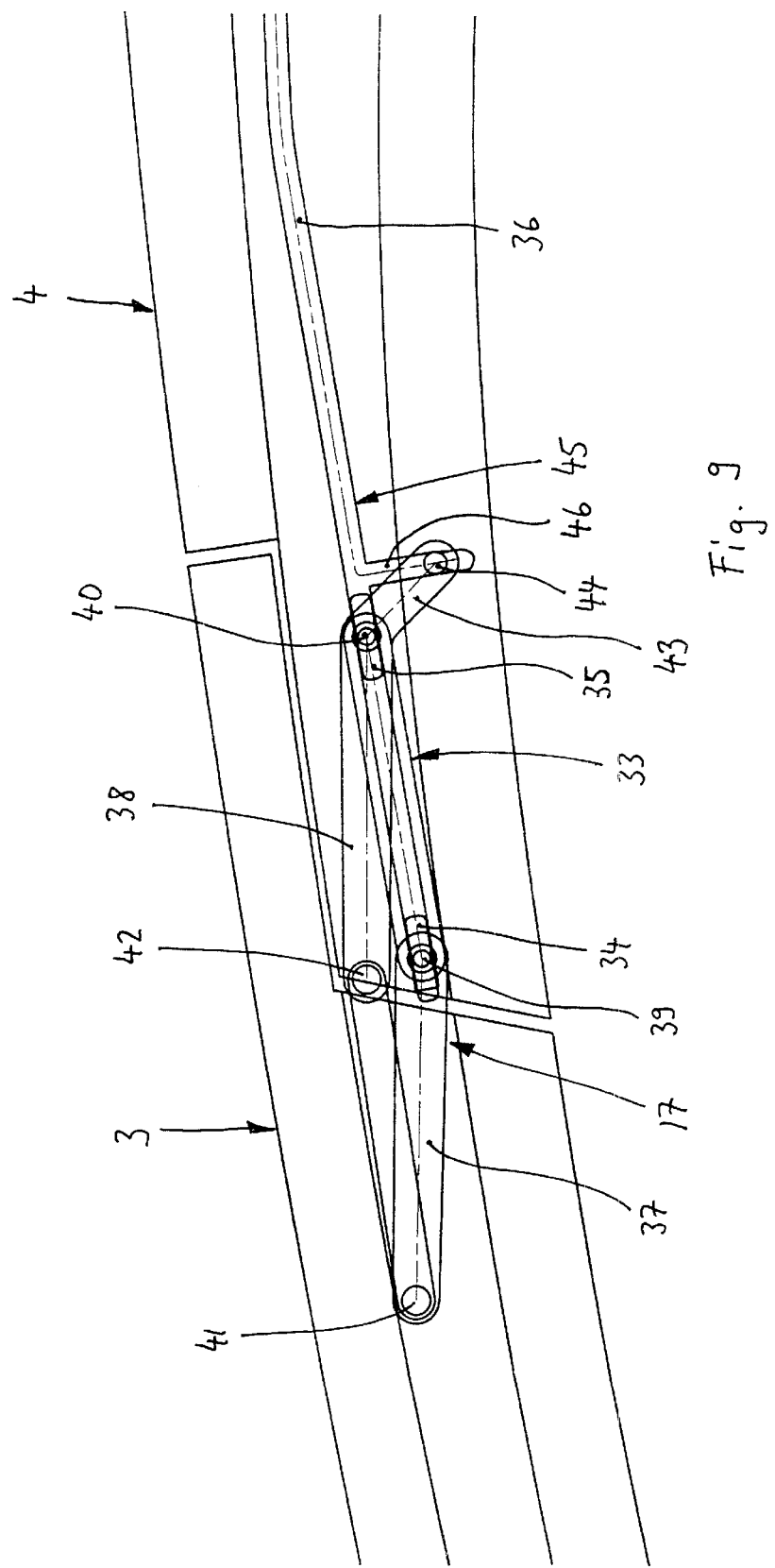
FIG. 9 is an enlarged side view of an extract of another embodiment of the roof.

Another embodiment of the roof 1 (see FIGS. 9 to 11) contains a modified carrier means 17 with a carrier element 33 which is movably supported, for example, via two carriages 34, 35 on a lengthwise guide 36 which is located on the middle element 4. A front and a rear lever 37, 38 of a four-bar mechanism are, on the one hand, supported to pivot in joints 39, 40 on the carrier element 33, and on the other hand, to pivot on the front element 3 in joints 41, 42. A control lever 43 of the rear lever 38, which control lever extends beyond the lower joint 40, is guided via a control element 44 in a control cam 45.

Figure 10:
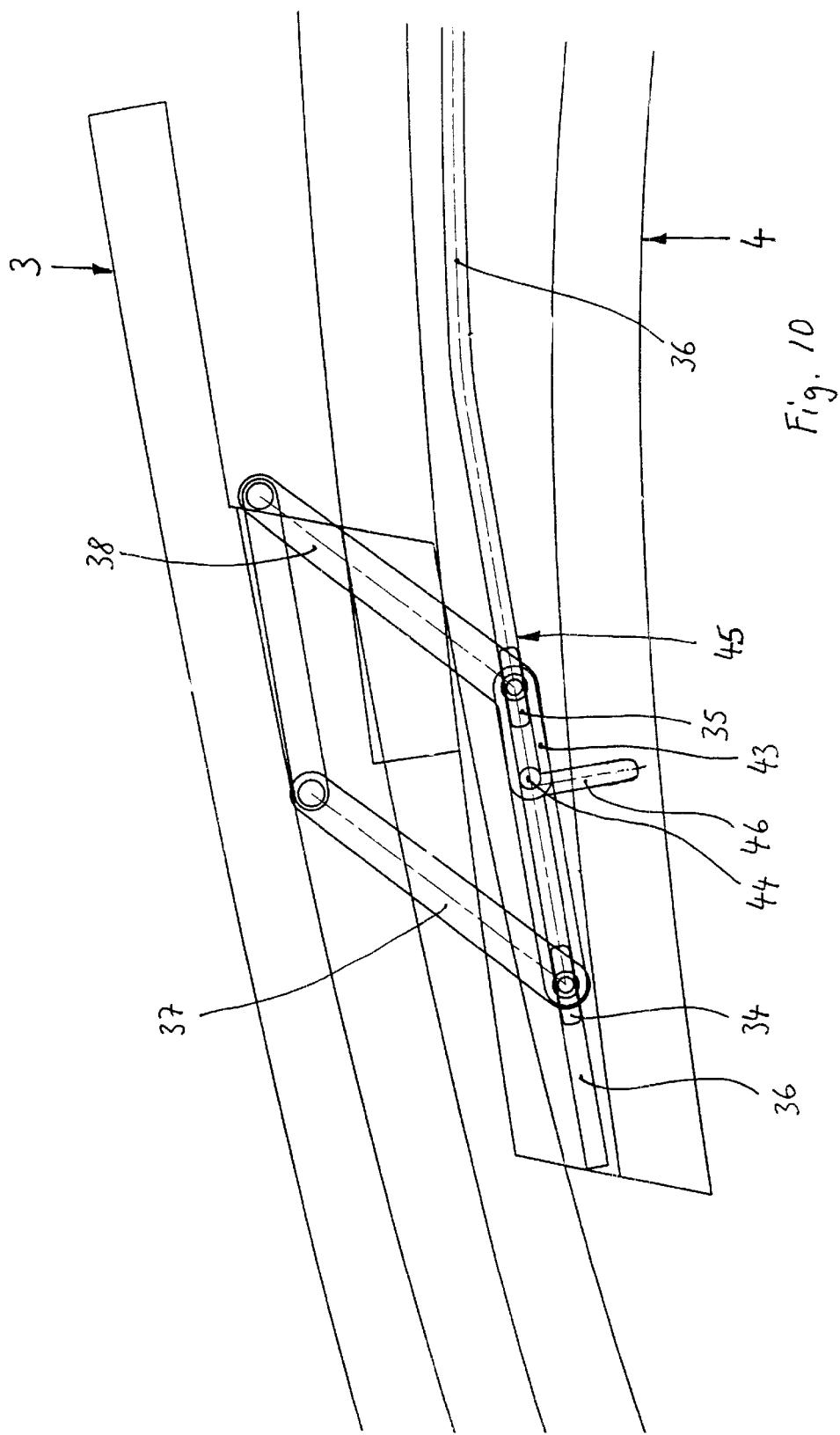
FIG. 10 is an enlarged side view of an extract of the embodiment of FIG. 9 with the raised front element of the roof.
Figure 11:
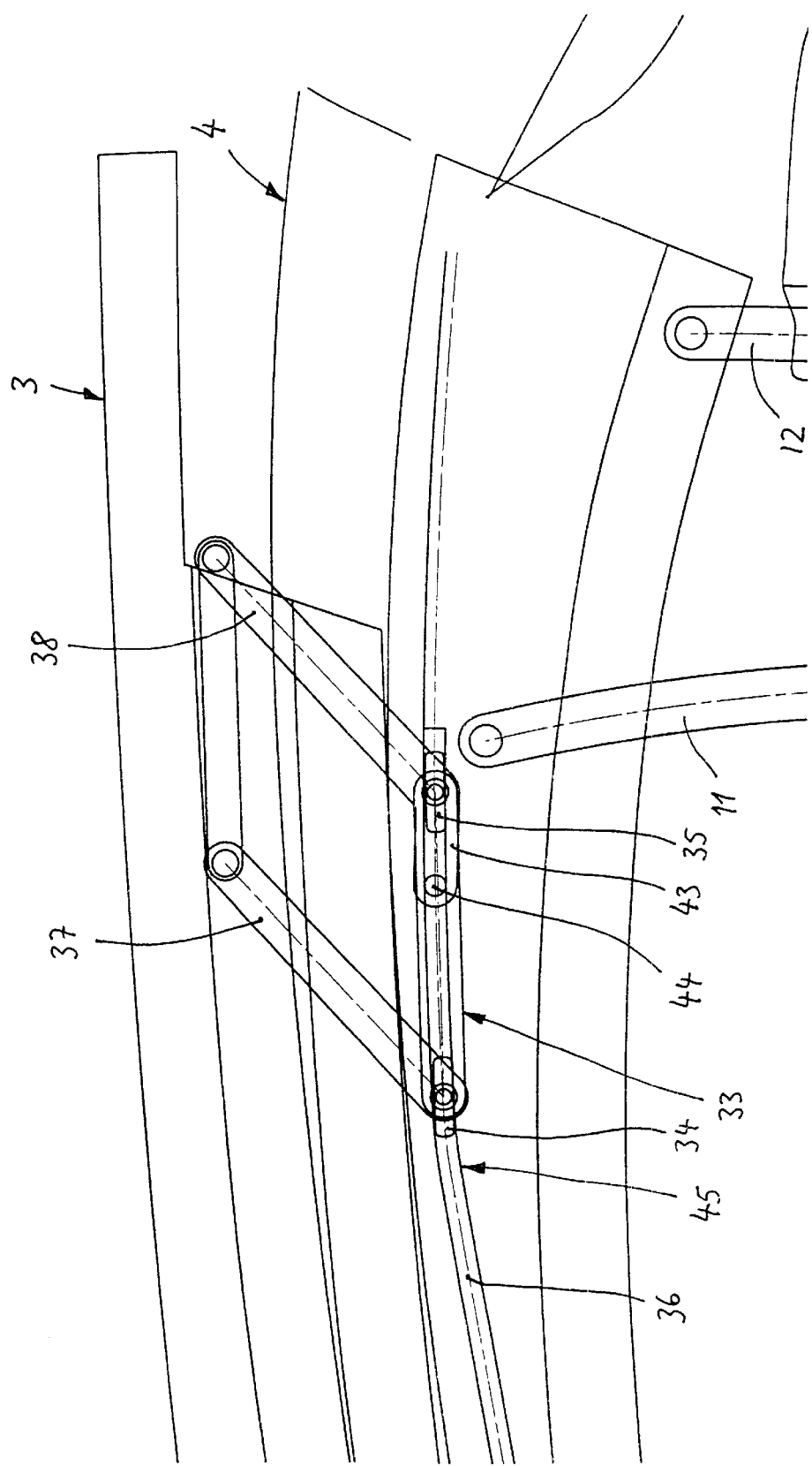
FIG. 11 is an enlarged side view of an extract of the embodiment of FIG. 9 with the front element displaced.

In the closed position of the roof 1 (see FIG. 9), the control element 44 is held in an initial section 46 which is located at an angle to the control cam 45 such that the four-bar mechanism 37, 38 is swung forward, and thus, is located lowered together with the front element 3. To open the roof 1, the carrier element 33 is pushed to the rear, as a result of the configuration of the control lever 43, the rear lever 38 being swung to the rear around the control element 44 which is movably held in the initial section 46 until the rear carriage 35 has assumed a distance from the initial section 46 such that the control element 44 in the lengthwise running control cam 45, which can be formed by the lengthwise guide 36, has entered (FIG. 10). The rear lever 38 now retains its pivoted position while it is pushed with the carrier element 33 along the lengthwise guide 36. Thus, the front element 3 remains in its raised displacement position in which it is pushed over the middle part 4. The end position of the displacement motion of the front element 3 is shown in FIG. 11.

The roof 1 is closed likewise in the reverse sequence of motions.

Figure 12:
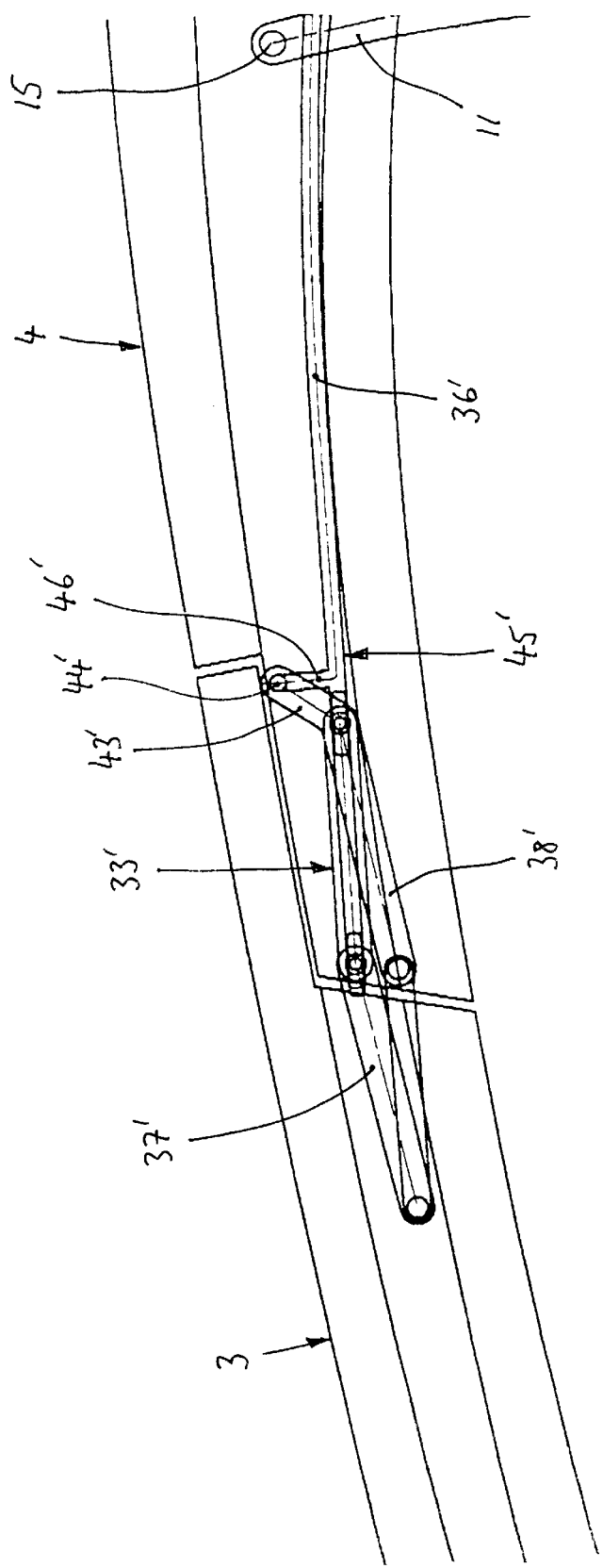
FIG. 12 is an enlarged side view of an extract of the embodiment of another embodiment of the roof.
Figure 13:
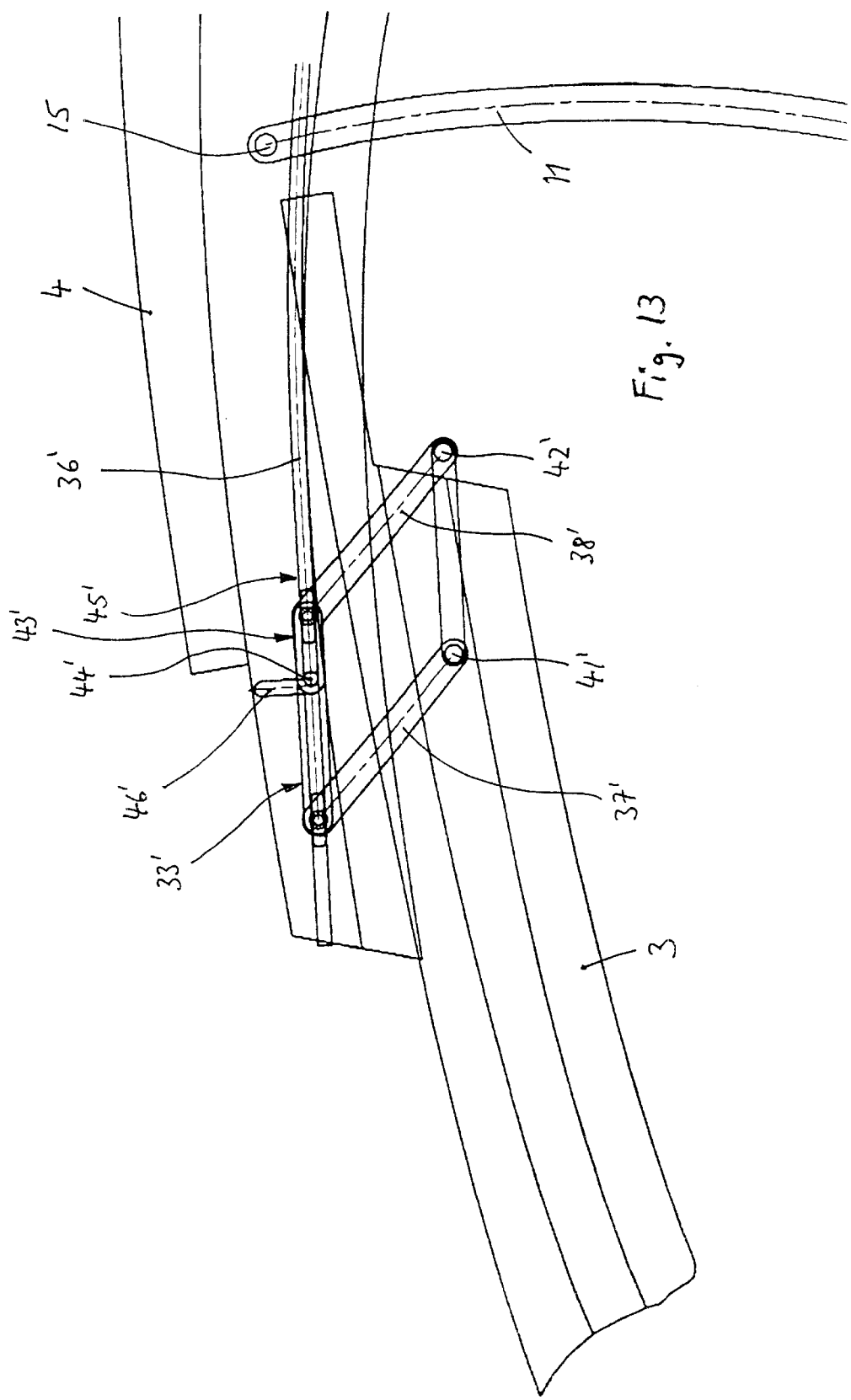
FIG. 13 is an enlarged side view of an extract of the embodiment of FIG. 12 with the lowered front element of the roof.
Figure 14:
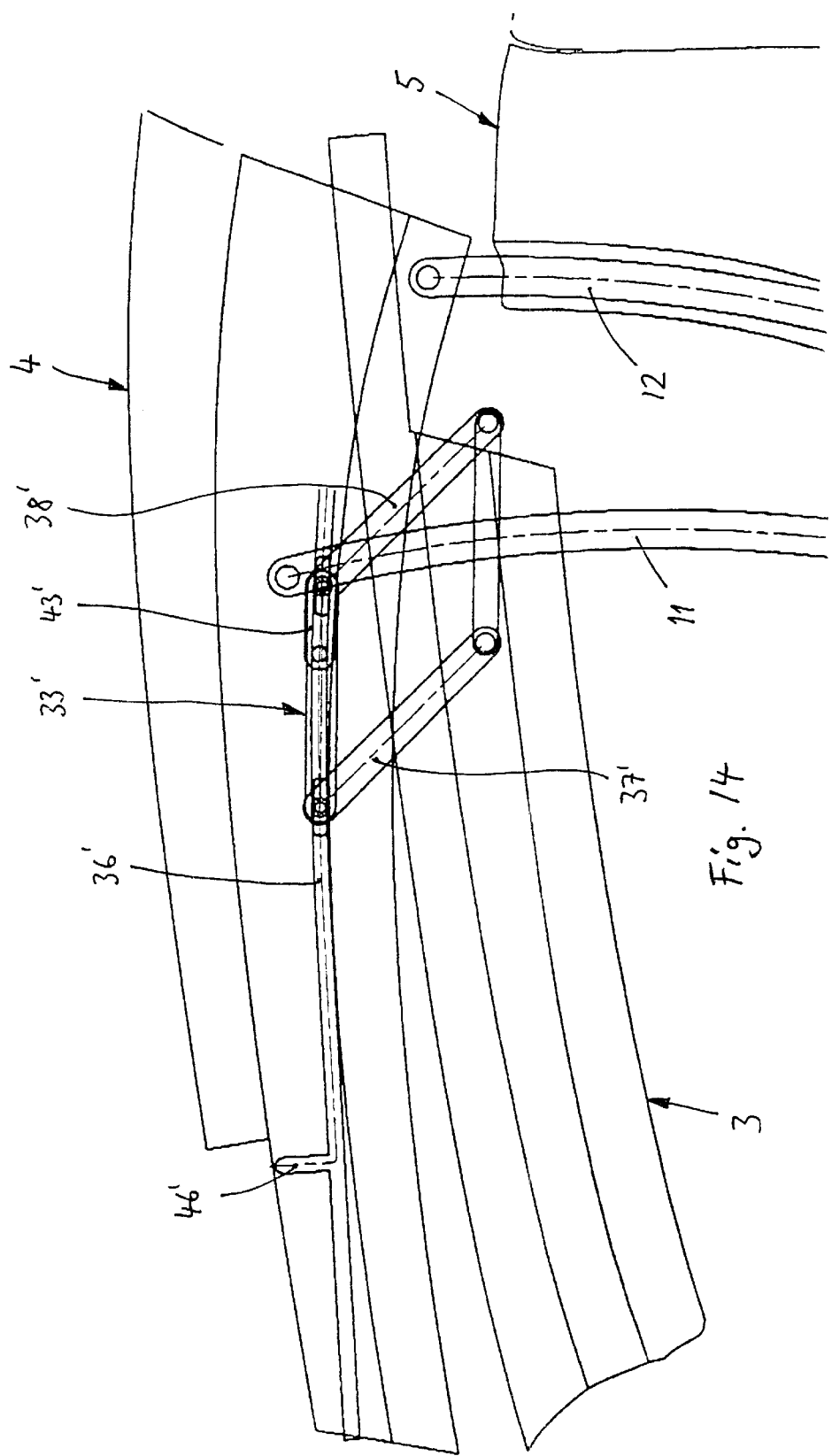
FIG. 14 is an enlarged side view of an extract of the embodiment of FIG. 12 with the front element pushed under the middle element of the roof.

Another embodiment of the roof 1 (see FIGS. 12 to 14) is a version which is built similarly to the above described embodiment, but in which the front element 3 is lowered relative to the middle element 4 and is moved to under the middle element 4. To do this, the front and the rear lever 37', 38' of the carrier means 17' are supported on the carrier element 33' and on the front element 3 such that they can be swung down and can lower the front element 3. To control the lowering motion, the initial segment 46' extends from the control cam 45' upward.

To open the roof 1, the carrier element 33' is pushed to the rear, initially the control element 44' moving in the initial section 46', and in doing so, it pivots the rear lever 38' downward around the joint 40'. When the control element 44' travels into the control cam 45' (see FIG. 13), the pivoting motion of the rear lever 38', and thus, of the four-bar mechanism 37', 38' is ended. Via the four-bar mechanism 37', 38' which is held in this position, the front element 3 is pushed via its drive to the rear to under the middle element 4 (FIG. 14) before the roof elements 3, 4, 5 are deposited in the convertible top compartment 9.

What is claimed is:

1. Lowerable roof of a hard-top convertible comprising:
   a front roof element,
   a middle roof element on which the front roof element is movably supported,
   a rear roof element, and
   bearing means for moving said roof elements from a closed position for covering a motor vehicle interior into an open position in which the roof elements are deposited on top of one another in a rear-side convertible top storage compartment;

wherein the front roof element is one of raisable and lowerable by a carrier mechanism which supports the front roof element on the middle roof element and is then movable by a lengthwise guide to a position, respectively, one of over and under the middle roof element when the roof is to be deposited in the storage compartment.

2. Roof as claimed in claim 1, wherein the carrier mechanism is coupled to a main four-bar mechanism which supports the middle roof element, the main four-bar mechanism having a raising and lowering motion.

3. Roof as claimed in claim 2, wherein the four-bar mechanism is coupled to a pivot bearing for movably supporting the middle roof element on a vehicle body.

4. Roof as claimed in claim 3, wherein one of the carrier mechanism and the main four-bar mechanism has a carrier element which is movably guided on the lengthwise guide of the front element.

5. Roof as claimed in claim 1, wherein the carrier mechanism has a main four-bar mechanism which supports the front roof element on the middle roof element and which is movably guided on the lengthwise guide of the middle roof element and during lengthwise displacement of the front roof element relative to the middle roof element executes raising and lowering motion of the front element by a control means.

6. Roof as claimed in claim 5, wherein a lever of the four-bar mechanism has a control element which is guided in a control cam.

7. Roof as claimed in claim 6, wherein the lengthwise guide forms a section of the control cam.

8. Roof as claimed in claim 5, wherein the front roof element is movable by a drive means.

9. Roof as claimed in claim 3, wherein the pivot bearings of the middle roof element are connected to two rods of the main four-bar mechanism.

10. Roof as claimed in claim 1, wherein the rear roof element has an opposite camber relative to the front roof element and the middle roof element when positioned in the convertible top compartment.

11. Roof as claimed in claim 9, wherein one of said two rods of the main four-bar mechanism is attached to the rear roof element and supports the middle element.

12. Roof as claimed in claim 1, wherein the carrier mechanism has a carrier element which is movable supported by carriages on a lengthwise guide which is located on the middle roof element; wherein a front and a rear lever of a four-bar mechanism are supported to pivot in joints on the carrier element and to pivot in joints on the front roof element; wherein the rear lever has a control lever which extends beyond a lower one of the joints on the carrier element and is guided via a control element in a control cam.

13. Roof as claimed in claim 12, wherein, in the closed position of the roof, the control element is held in an initial section of the control cam which is located at an angle to a lengthwise running section of the control cam for causing the rear lever of four-bar mechanism to swing to the rear around the control element which is movably held in the initial section until the rear carriage has assumed a distance from the initial section such that the control element passes from the initial section into the lengthwise running section of the control cam so as to retain the rear lever in a pivoted position while the lever is pushed with the carrier element along the lengthwise guide.

14. Roof as claimed in claim 4, wherein the carrier mechanism has a main four-bar mechanism which supports the front roof element on the middle roof element and which is movably guided on the lengthwise guide of the middle element and during lengthwise displacement of the front roof element relative to the middle roof element produces a vertical motion of the front element by a control means; wherein a front lever and a rear lever of the four-bar mechanism of the carrier means is pivotally supported at joints on the carrier element and on joints on the front roof element, said front and rear levers being downwardly swingable in a manner lowering the front roof element relative to the middle roof element and moving the front roof element to under the middle element.

15. Roof as claimed in claim 14, wherein, to control lowering motion of the front roof element, the control means has an initial segment that extends upward from a lengthwise running section of a control cam.

16. Roof as claimed in claim 15, wherein, upon rearward displacement of the carrier element to open the roof, initially the control element is movable in the initial section in manner causing pivoting of the rear lever downward until the control element travels from the initial section into the lengthwise running section the control cam, the front cover element then being displaceable via the four-bar mechanism to the rear to under the middle element.

* * * * *